(12) United States Patent
Kennedy

(10) Patent No.: US 7,819,766 B2
(45) Date of Patent: Oct. 26, 2010

(54) DEVICE FOR COUPLING PULLEYS OR GEAR WHEELS

(76) Inventor: Paul Charles Kennedy, 9310 Pine View La., Clinton, MD (US) 20735

(*) Notice: Subject to any disclaimer, the term of this patent is extended or adjusted under 35 U.S.C. 154(b) by 0 days.

(21) Appl. No.: 11/705,927

(22) Filed: Feb. 14, 2007

(65) Prior Publication Data
US 2007/0191175 A1   Aug. 16, 2007

Related U.S. Application Data

(60) Provisional application No. 60/774,860, filed on Feb. 16, 2006.

(51) Int. Cl.
*F16H 55/17* (2006.01)
(52) U.S. Cl. .......... 474/152; 474/95; 403/197; 403/199; 403/290; 403/348
(58) Field of Classification Search ........ 403/192, 403/194, 195, 196, 197, 199, 289, 290, 344, 403/353, 348, 349, 350, 398; 474/95, 96, 474/97, 98, 99, 152; 74/594.2
See application file for complete search history.

(56) References Cited

U.S. PATENT DOCUMENTS

| | | | | |
|---|---|---|---|---|
| 1,485,621 A | * | 3/1924 | Loeffler | 474/98 |
| 2,645,438 A | * | 7/1953 | Kalikow | 403/348 |
| 2,665,930 A | * | 1/1954 | Stanley | 403/350 |
| 3,005,356 A | * | 10/1961 | Gandrud | 474/96 |
| 3,388,614 A | * | 6/1968 | De Coye De Castelet | 403/348 |
| 5,133,617 A | * | 7/1992 | Sokn et al. | 403/349 |
| 5,158,505 A | * | 10/1992 | Woyach | 474/95 |
| 5,833,562 A | * | 11/1998 | Walker, Sr. | 474/96 |
| 6,074,316 A | * | 6/2000 | Murrietta, Sr. | 474/96 |
| 6,176,797 B1 | * | 1/2001 | Vine | 474/95 |

\* cited by examiner

*Primary Examiner*—Michael P Ferguson
(74) *Attorney, Agent, or Firm*—Smith Patent Office

(57) ABSTRACT

A coupling device (10) for a gear wheel (12), a pulley or other similar units comprising a support (18) for a gear wheel (16) or an operating portion of the pulley or unit, means for centering and drawing the crown gear (16) or the operating portion on the support and means for holding the crown gear (16) or operating portion against the support (18) along a parallel direction relative to a rotation axis of the gear wheel or pulley or unit, said means comprising a locking member (34) suitable to be fixed to the support (18) for defining an abutment for the crown gear (16) or operating portion.

16 Claims, 19 Drawing Sheets

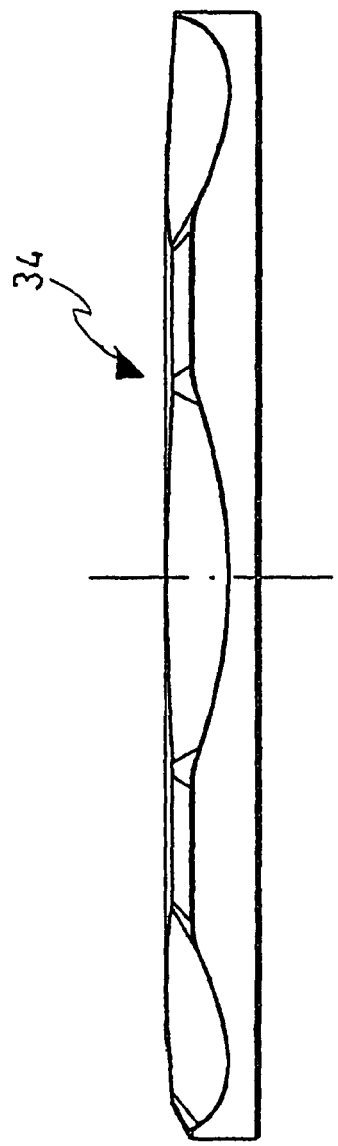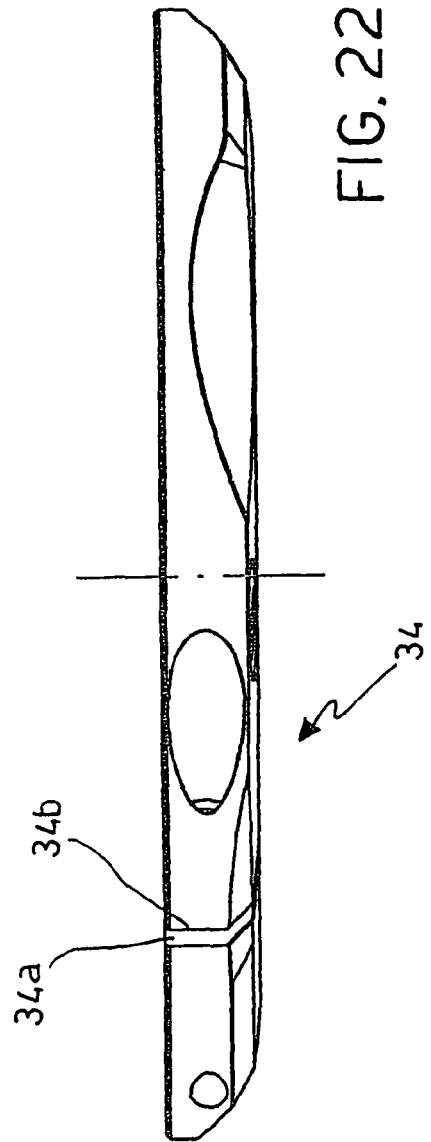

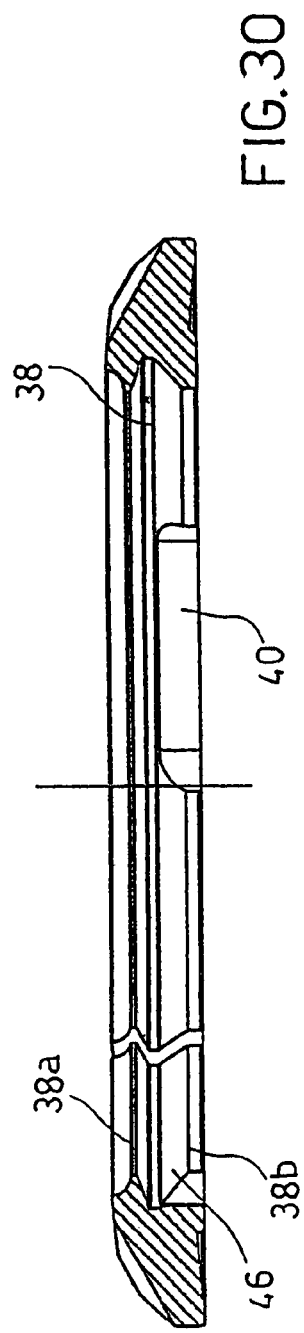
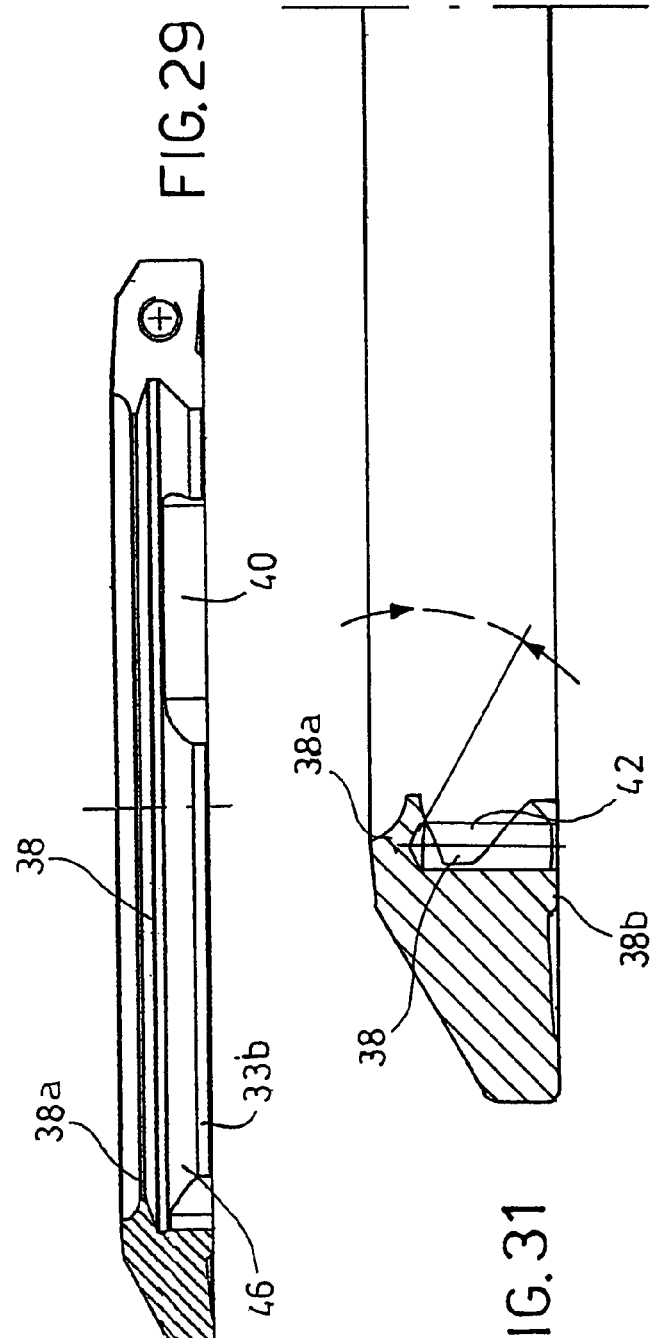

US 7,819,766 B2

DEVICE FOR COUPLING PULLEYS OR GEAR WHEELS

CROSS-REFERENCE TO RELATED APPLICATIONS

I claim the benefits of priority of provisional application No. 60/774,860 filed on Feb. 16, 2006.

BACKGROUND OF THE INVENTION

The object of the present invention is a device and a method for coupling pulleys or gear wheels and the like.

Preferably, the present invention relates to a device and a method for coupling pulleys, gear wheels or other units which are intended for use in the motor field, and particularly in the racing field. More preferably, though not being limited thereto, the present invention relates to a device and a method for coupling pulleys, gear wheels and other drive units.

Pulleys or gear wheels are known, for example in drive systems, which consist of two parts interconnected by bolts requiring to be individually screwed/unscrewed during the assembly/disassembly step. Both steps are then quite complicated, laborious and require a certain amount of time also when carried out by skilled operators. A first general need is therefore to reduce costs and simplify the assembly/disassembly steps of the pulleys or gear wheels, for example in drive systems.

In addition, in the racing field, the need to optimize the performance of the vehicle on a track is particularly felt, such as by replacing the crown gears or pulleys of the drive system such that the vehicle can be quickly adapted to the conditions of the track. Accordingly, there results the need for reducing the replacement time of crown gears o pulleys defining the gear ratios of the power transmission between the motor and wheels of the vehicle.

SUMMARY OF THE INVENTION

The problem at the heart of the present invention is to provide a device and a method for coupling pulleys or gear wheels and the like, which have such structural and functional characteristics to overcome said drawbacks set forth with reference to the prior art, and meet said requirements.

Further embodiments are the object of dependent claims.

BRIEF DESCRIPTION OF THE SEVERAL VIEWS OF THE INVENTION

Further characteristics and the advantages of the device and method for coupling pulleys or gear wheels and the like according to the invention will result from the description set forth below of preferred exemplary embodiments, which are given by way of non-limiting illustration, with reference to the annexed figures, in which:

FIGS. 22 and 23 illustrate side views of the detail from FIG. 21 according to the directions XXII and XXIII from FIG. 21, respectively;

FIG. 29 illustrates a sectional view of the detail from FIG. 21 according to the line XXIX-XXIX from FIG. 28;

FIG. 30 illustrates a sectional view according to the line XXX-XXX of the detail from FIG. 21;

FIG. 31 illustrates a sectional view according to the line XXXI-XXXI of a particular of the detail from FIG. 28;

DETAILED DESCRIPTION OF THE INVENTION

With reference to said figures, a coupling device for a gear wheel 12 has been generally designated with 10. More particularly, the coupling device as shown in the figures is suitable to be used in a drive system such as in a racing vehicle.

Figure 1:
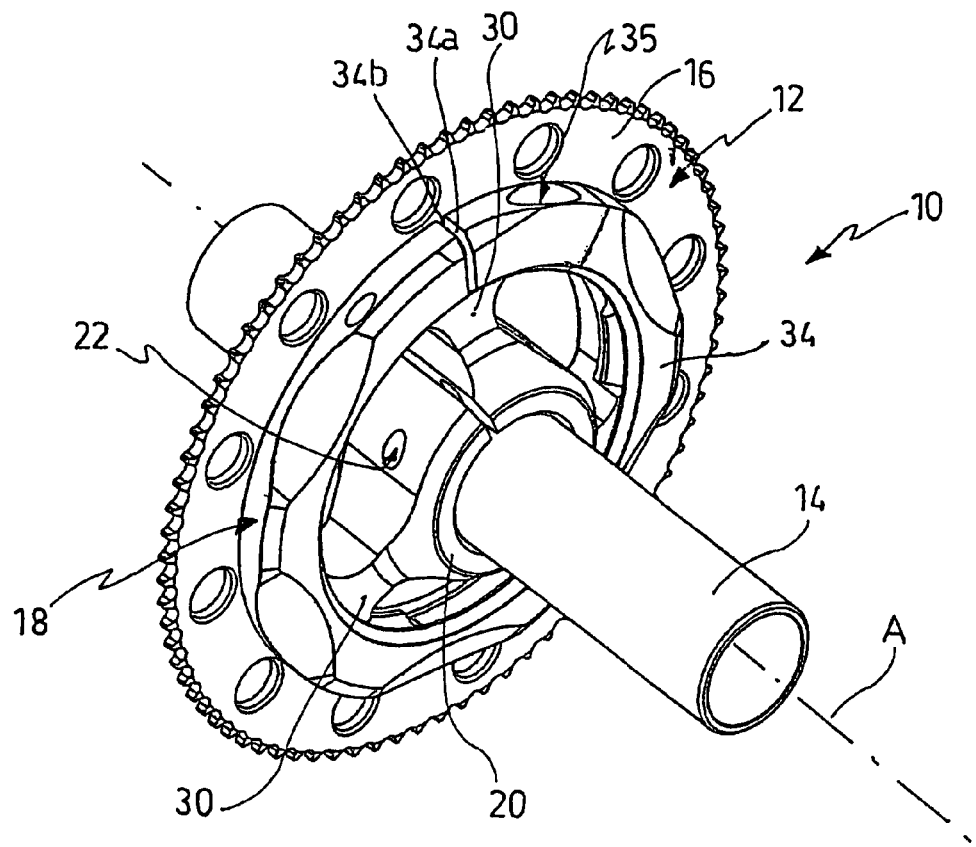
FIG. 1 illustrates a perspective schematic view of a coupling device according to the present invention being mounted on a shaft.
Figure 2:
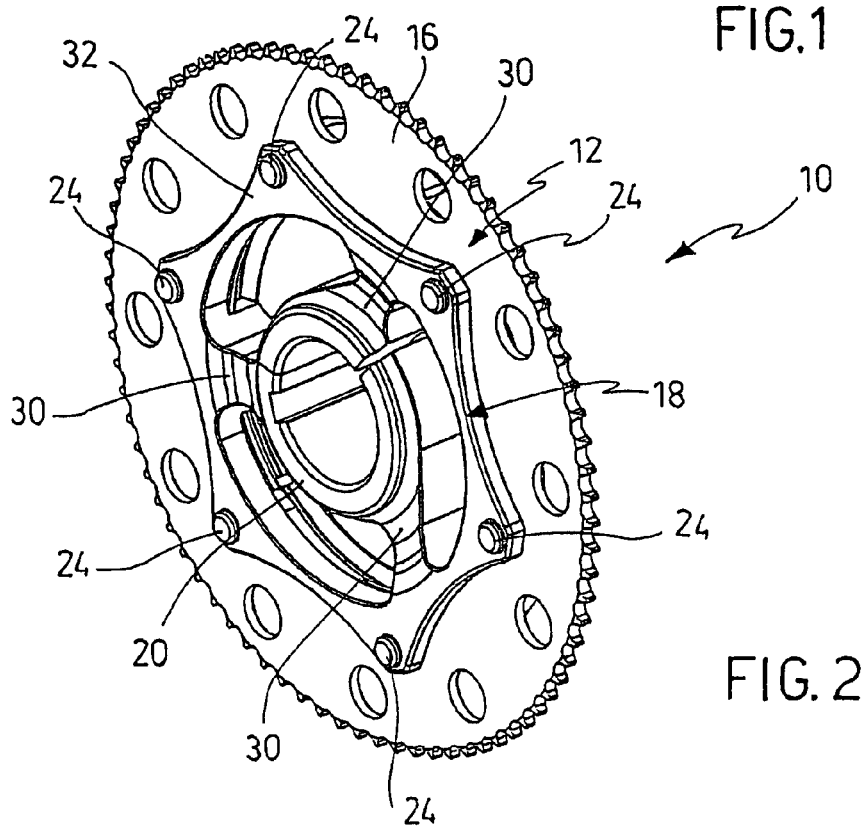
FIG. 2 illustrates a perspective view of the device from FIG. 1 from a different point of view.

With reference to FIG. 1, with 14 has been designated a shaft of the drive system, for example the shaft to which motion and power are transmitted. The gear wheel 12 is thus splined or coupled to the shaft 14. With A has been designated a rotation axis of the gear wheel 12 and shaft 14.

With reference to the rotation axis A, by axial direction is meant a direction parallel to the rotation axis A, by radial direction is meant a direction perpendicular to the rotation axis A and by tangential or circumferential direction is meant a direction perpendicular to a radial direction.

In accordance with a possible embodiment, the gear wheel 12 comprises a crown gear 16 that is coupled to a support 18 suitable to be splined or coupled to the shaft 14. For example, the support 18 comprises a middle hub portion 20 suitable to be splined and coupled to the shaft 14 by means of a shape coupling and/or by means of a threaded connection 22.

FIG. 12 to 20 illustrate several views of a possible embodiment of the support 18.

Figure 9:
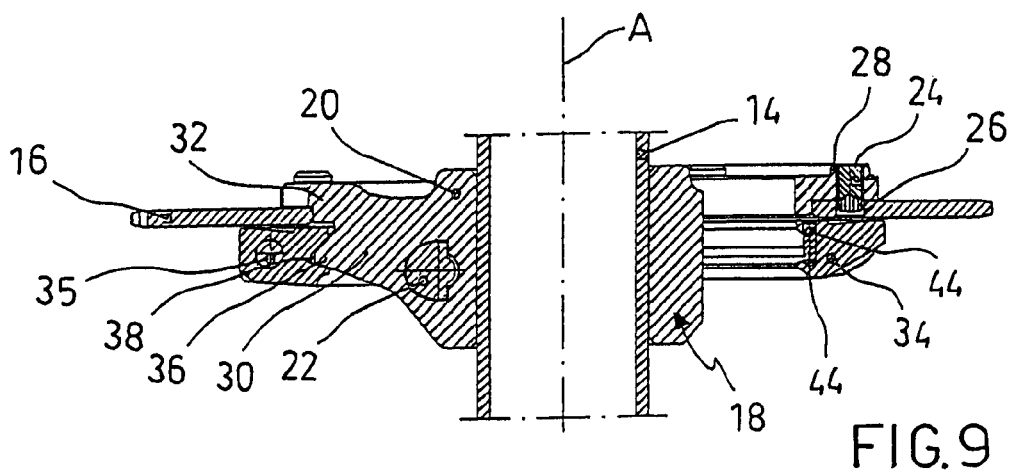
FIG. 9 is a sectional view of the coupling device according to the line IX-IX from FIG. 8.

In accordance with a possible embodiment, the support 18 comprises means for centering and drawing the crown gear 16. These means may comprise projections of the support 18 that are suitable to be fitted within seats of the crown gear, or pins or threaded dowels 24, such as illustrated in FIG. 9, which are suitable to be axially fitted within relative seats 26 and 28 of the crown gear 16 and support 18, respectively.

In the figures, there are illustrated six threaded dowels 24 that are evenly spaced apart along a circumference of the crown gear 16, though they may be provided in number, shape and locations other than those illustrated.

In accordance with a possible embodiment, the support 18 comprises at least one spoke 30, preferably three spokes 30 that are evenly spaced apart and radially extending along a support face of the support 18 between the middle portion 20 and a peripheral portion 32 comprising the means for centering and drawing the crown gear 16.

The coupling device according to the present invention advantageously comprises means for holding the crown gear 16 against the support 18 in a direction parallel to the rotation axis of the gear wheel 12. These means comprise a locking member 34 suitable to be fixed to the support 18 to define an abutment for the crown gear 16.

Advantageously, the locking member 34 is mounted on the support 18 by means of a shape coupling suitable to axially lock the locking element, and thus the crown gear 16, and press the crown gear 16 against the support 18.

In accordance with a possible embodiment, the shape coupling between the locking member 34 and the support 18 is suitable to press the crown gear 16 against the support following a variation, preferably a reduction, in a circumferential or radial dimension of the locking member 34.

Advantageously, the locking member 34 is ring-shaped being adapted for radial interference with both the support 18 and the crown gear 16. Preferably, the locking member 34 is shaped as an open ring and provided with means for moving free ends 34a and 34b of the ring towards each other, in order to reduce the radial or circumferential dimension thereof. These means preferably comprise threaded means that operate transversally between the free ends 34a and 34b of the ring. Advantageously, the threaded means comprise a screw 35 that is fitted within respective threaded seats of the locking element 34 and arranged in a substantially tangential direction thereto. The screw 35 is arranged between the free ends 34a and 34b for closing the open ring, such that free ends 34a and 34b are moved towards/away from each other, and the radial or circumferential dimensions of the locking member 34 are increased or decreased when the screw 35 is screwed/unscrewed within the respective seats.

In accordance with a possible embodiment, the shape coupling provided for the support 18 and the locking element 34 is of the bayonet type, comprising a locking mechanism 36 of the support 18 interlockably engaging a locking structure 38 of the locking element 34, comprising at least one tooth 36 suitable to be fitted in a circumferential groove 38 by means of at least one pasageway 40.

When two or more teeth 36 are provided, the passageways 40 are such that the teeth are allowed to simultaneously pass therethrough. Preferably, a passageway 40 is provided for each tooth 36.

According to a possible embodiment, the circumferential groove 38 is formed in the locking member 34 whereas the at least one tooth 36 is formed in the support 18. Preferably, the at least one tooth 36 is formed at a spoke 30. When three spokes 30 are provided, preferably three teeth 36 are provided.

In accordance with a possible embodiment, the at least one tooth 36 extends in the radial direction and the at least one passageway 40 for fitting within the circumferential groove 38 extends in an axial direction. In other words, the shape coupling of the locking member 34 and support 18 is provided by moving the locking member and the support towards each other in a direction parallel to the rotation axis A such that the teeth 36 are fitted within their respective passageways 40 until they become fitted within the groove. A subsequent relative rotation between the locking member 34 and the support 18 will cause the teeth 36 to slide within the circumferential groove 38. Preferably, the locking member 34 is rotated relative to the support 18 such that the teeth 36 will be arranged within the radial groove 38, the radial walls 38a and 38b thereof defining constraints to the axial displacement of the locking member 34 in both ways. One side of the locking member 34 directly faces the crown gear 16 that is at least partially arranged between the locking member 34 and the support 18, or at least the peripheral portion 32 thereof.

In accordance with a possible embodiment, the locking member 34 comprises at least one first end-of-stroke 42 that is arranged transversal to the circumferential groove 38. The first end-of-stroke 42 defines an abutment for the at least one tooth 36 following the relative rotation of the support 18 and locking element 34. Advantageously, the first end-of-stroke 42 is provided by means of a pin that is fitted between the side walls 38a and 38b of the circumferential groove such as to be arranged transversally thereto. In other words, the pin defining the first end-of-stroke 42 is arranged in the direction parallel to the rotation axis A. Advantageously, the first end-of-stroke 42 is fitted in an angular position which allows the at least one tooth 36 to be properly fitted within the circumferential groove 38, between the side walls 38a and 38b.

According to a possible embodiment, the locking member 34 comprises at least one second end-of-stroke 44 that is arranged crosswise to the circumferential groove 38. The second end-of-stroke 44 defines an hindrance for the at least one tooth 36 such as to impart a one-way rotation, preferably in the counter-clockwise direction with reference to FIG. 5. In other words, the second end-of-stroke 44 is inserted in an angular position in the vicinity of a passageway 40 to prevent that the locking member 34 may rotate in a direction, the locking member 34 being then allowed to rotate in the opposite direction, towards the first end-of-stroke 42. Advantageously, the second end-of-stroke 44 is provided by means of a pin inserted between the side walls 38a and 38b of the circumferential groove such as to be arranged transversal thereto. In other words, the pin defining the second end-of-stroke 44 is arranged in a parallel direction to the rotation axis A.

In accordance with an advantageous embodiment, the shape coupling between the locking member 34 and the support 18 comprises mutual inclined planes 46, 48 facing each other and suitable to contact each other. Advantageously, the circumferential groove 38 and the at least one tooth 36 have respective V-shaped, counter-shaped radial sections defining the relative inclined planes 46 and 48.

Advantageously, the inclined planes 46 and 48 are arranged such that a reduction in the radial or circumferential dimensions of the locking member 34 corresponds to the movement of the locking member towards the crown gear 16 and the consequent thrust by the latter against the peripheral portion 32 of the support 18.

Figure 10:
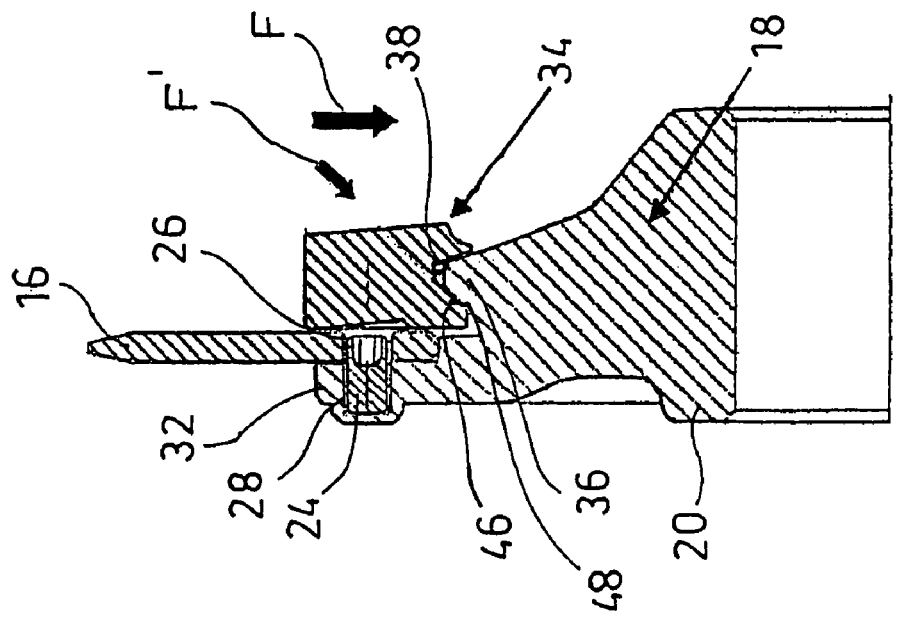
Figure 12:
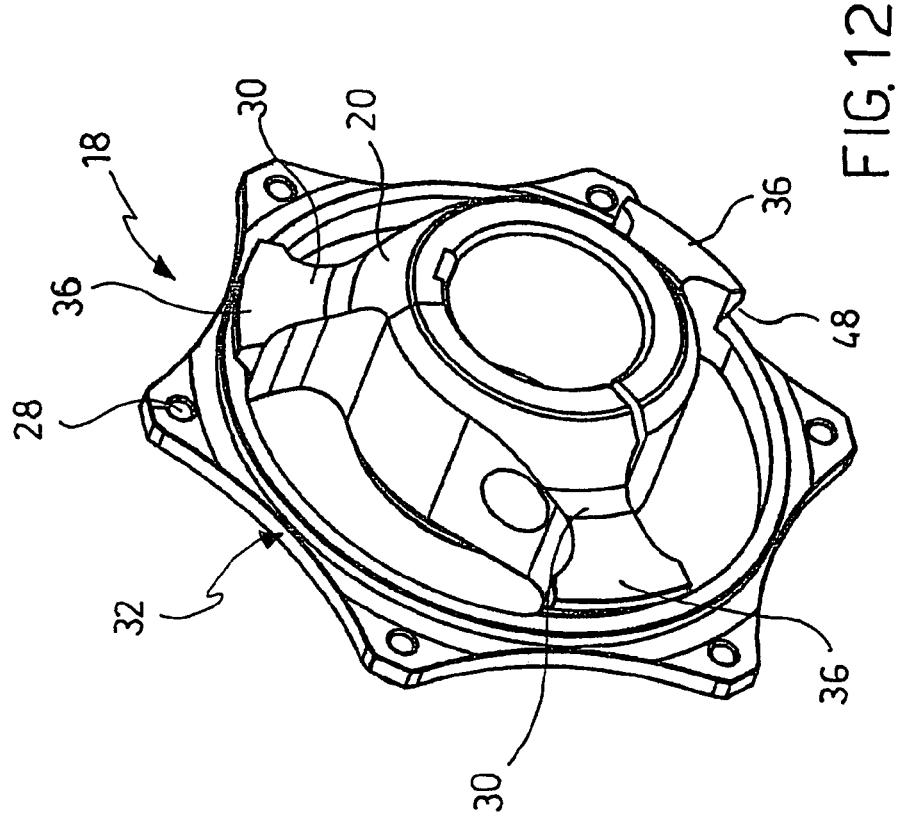
FIGS. 12 and 13 illustrate two perspective views of a detail of the coupling device according to the present invention as seen from different points of view.
Figure 13:
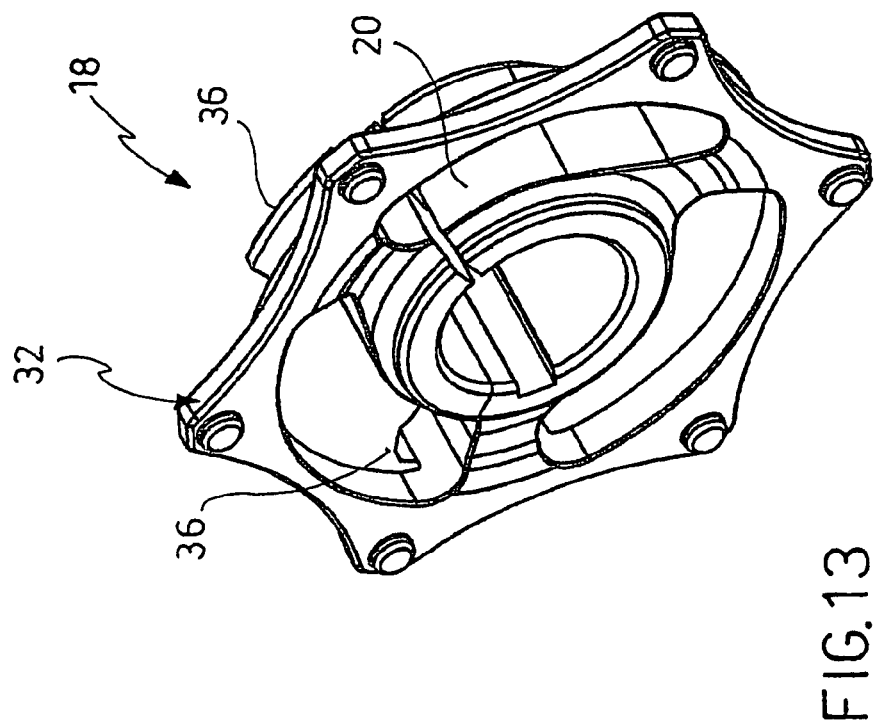
Figure 14:
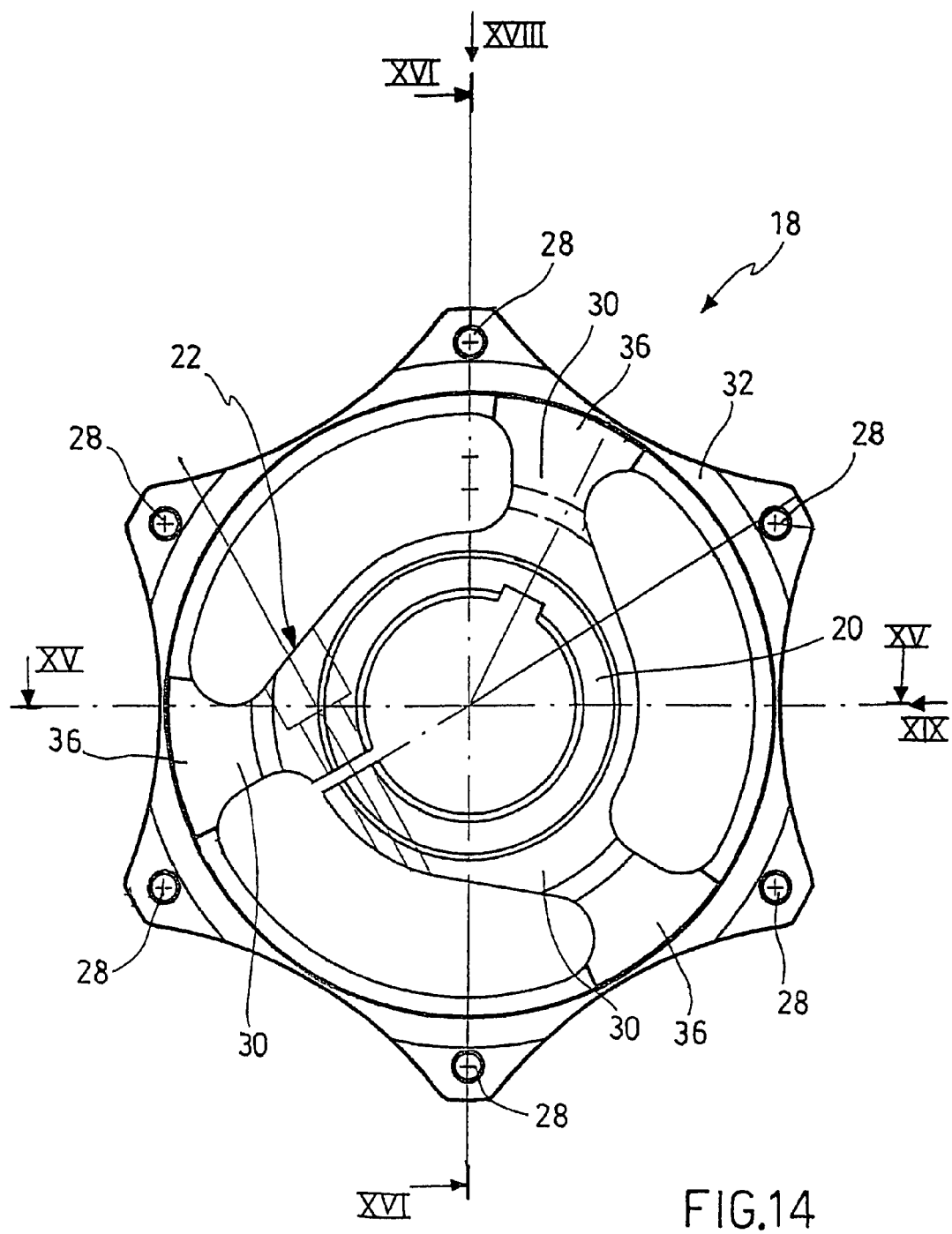
FIG. 14 illustrates a front view of the detail from FIGS. 12 and 13.
Figure 15:
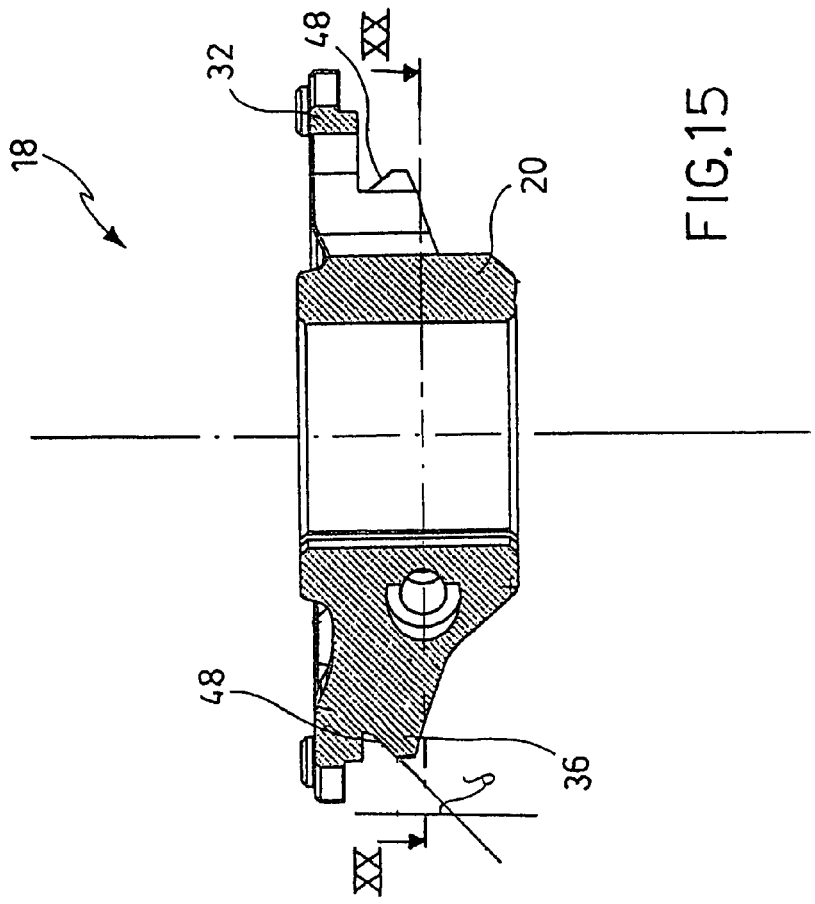
FIG. 15 illustrates a section of detail from FIG. 14, according to the line XV-XV from FIG. 14.
Figure 16:
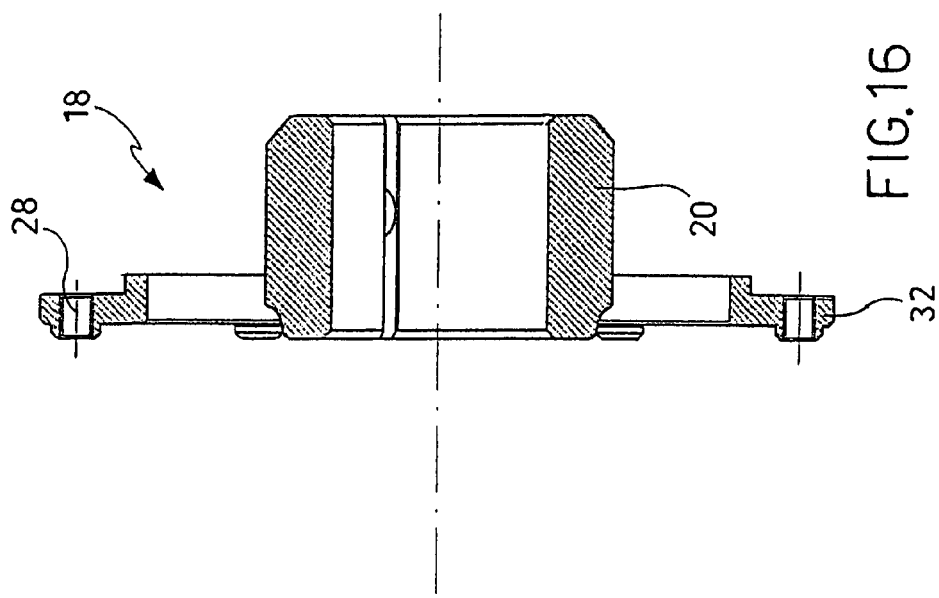
FIG. 16 illustrates a section of the detail from FIG. 14, according to the line XVI-XVI from FIG. 14.
Figure 17:
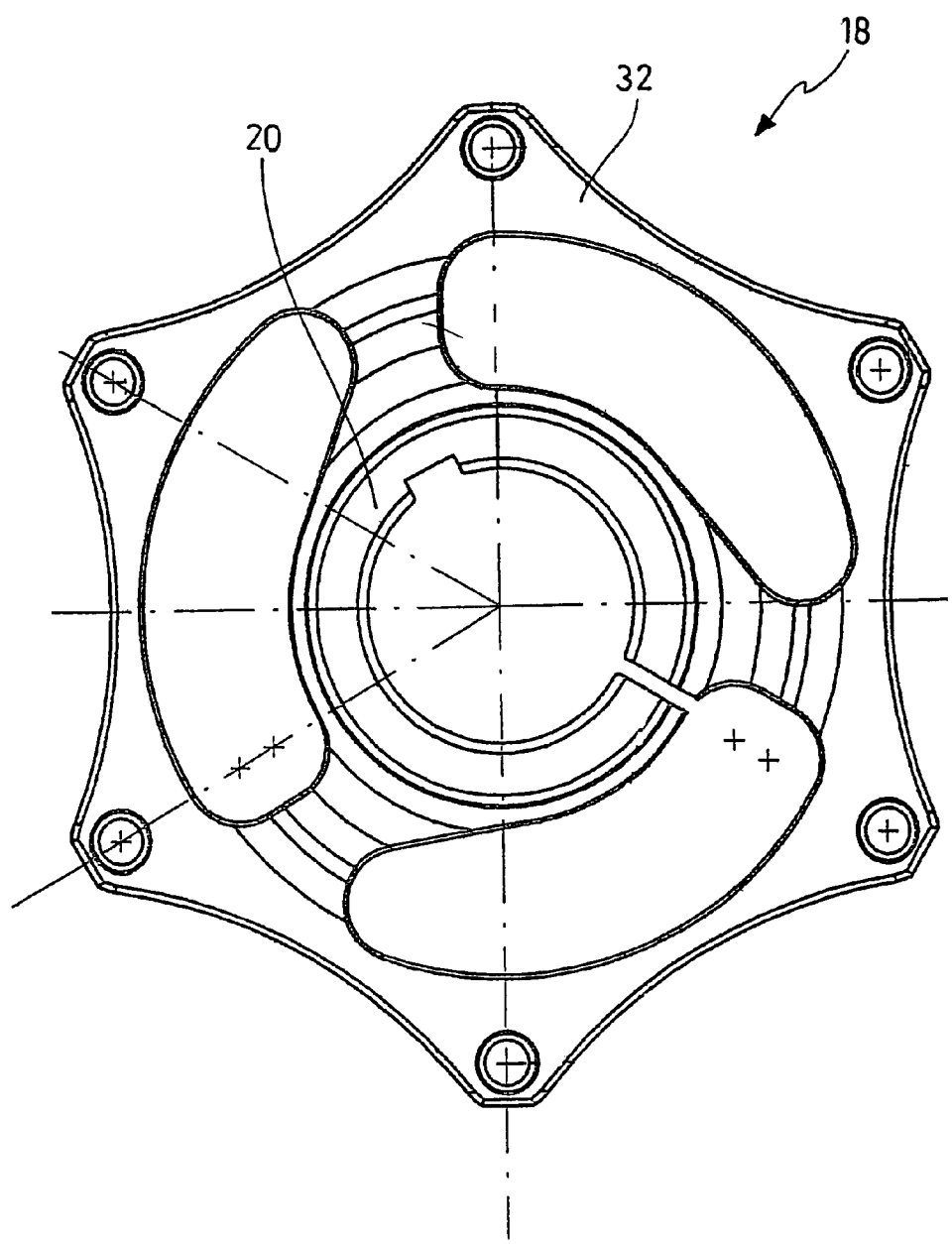
FIG. 17 illustrates the detail from FIG. 14 as seen from behind.
Figure 18:
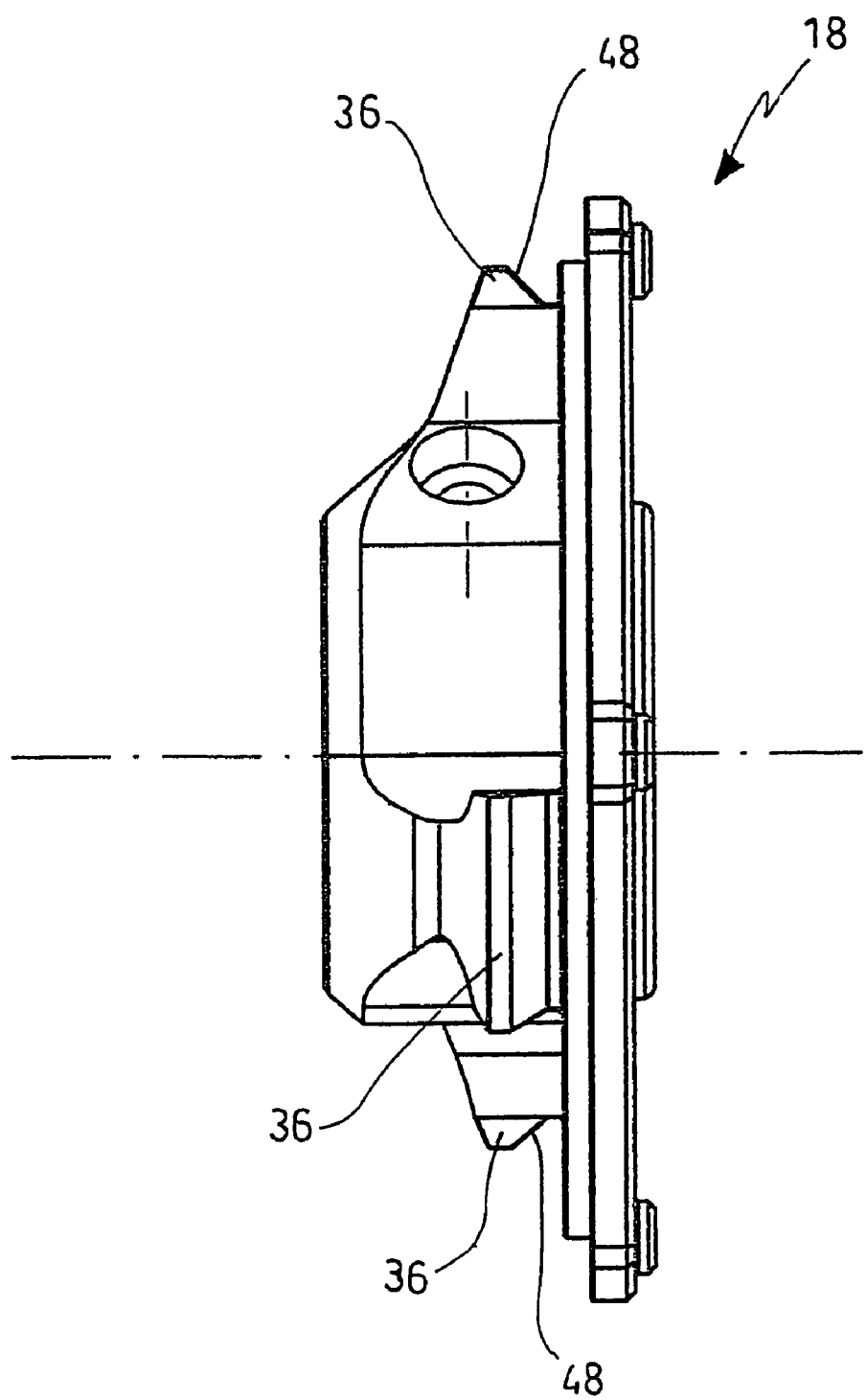
FIGS. 18 and 19 illustrate side views of the detail from FIG. 14 according to the directions XVIII and XIX from FIG. 14, respectively.
Figure 19:
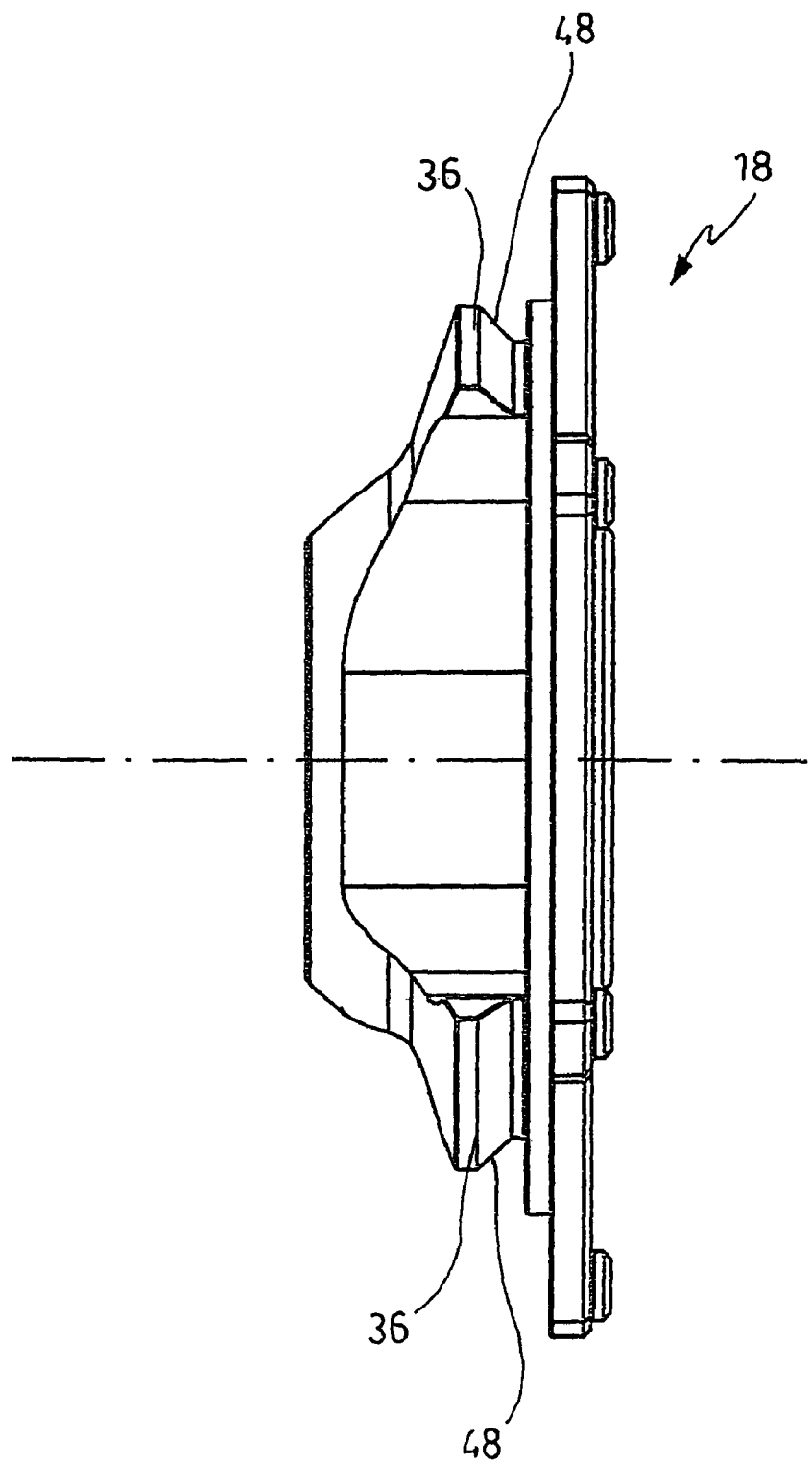
Figure 20:
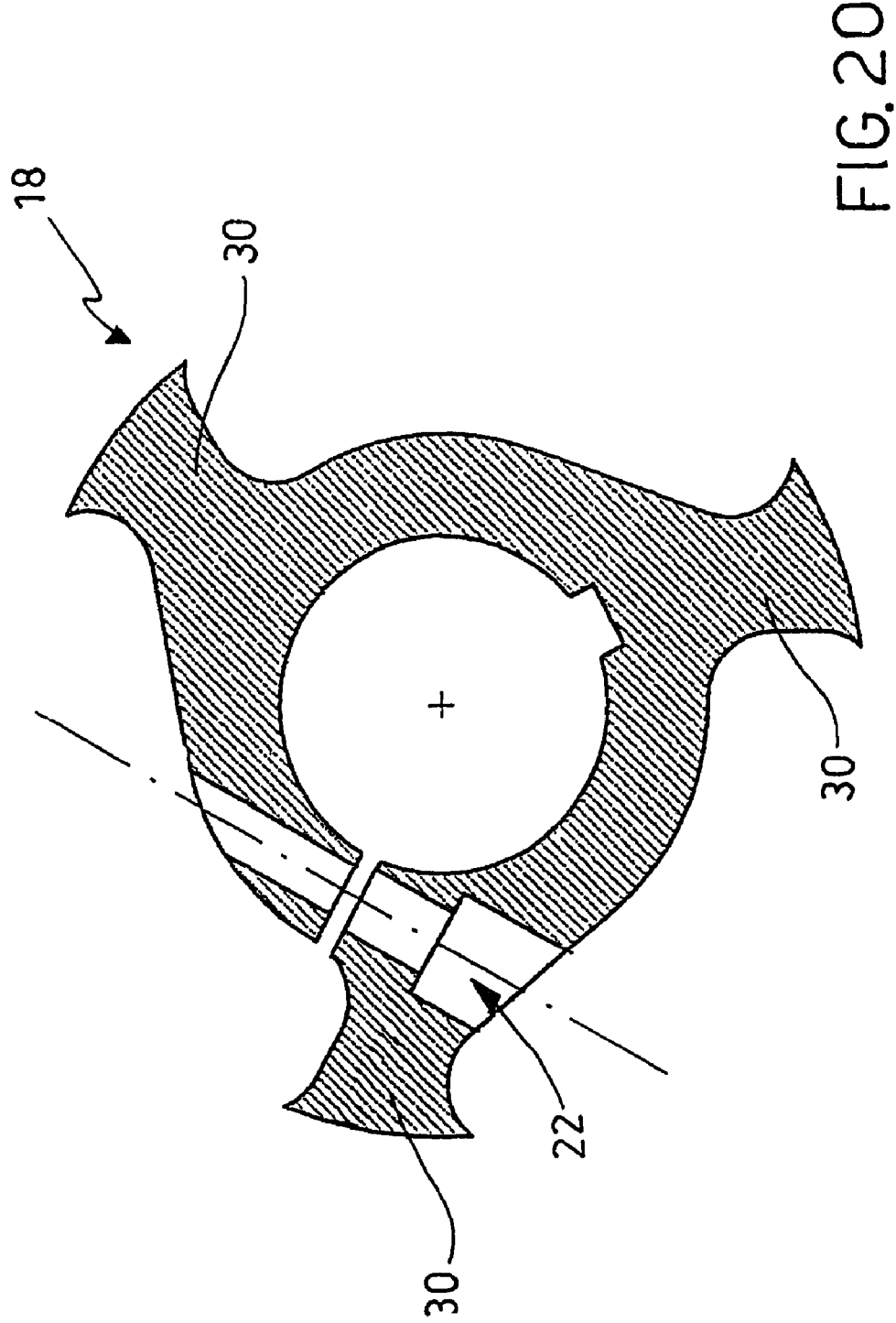
FIG. 20 illustrates a sectional view of the detail from FIG. 14 according to the line XX-XX from FIG. 15.
Figure 21:
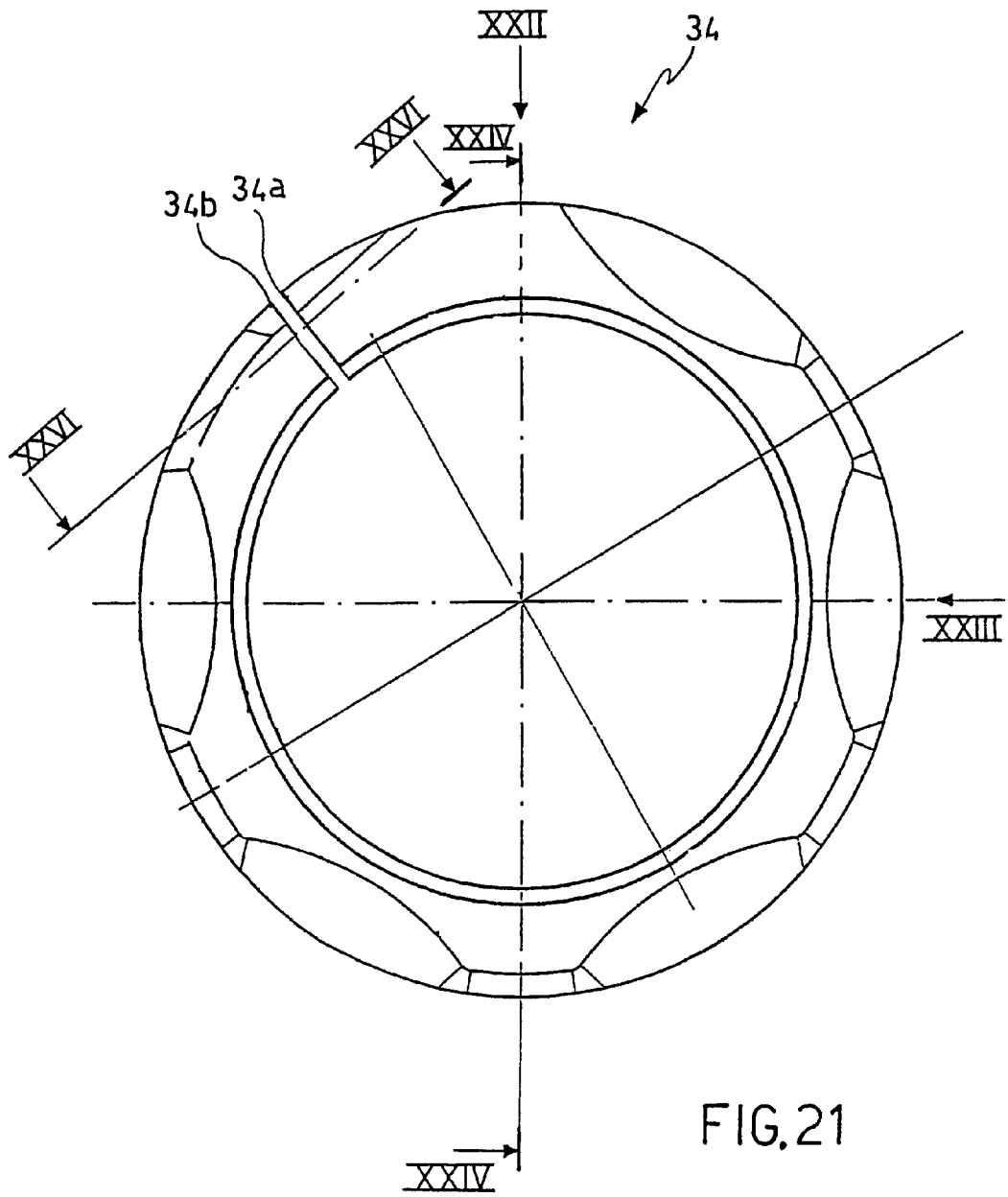
FIG. 21 illustrates a front view of a detail of the coupling device according to the present invention.
Figure 24:
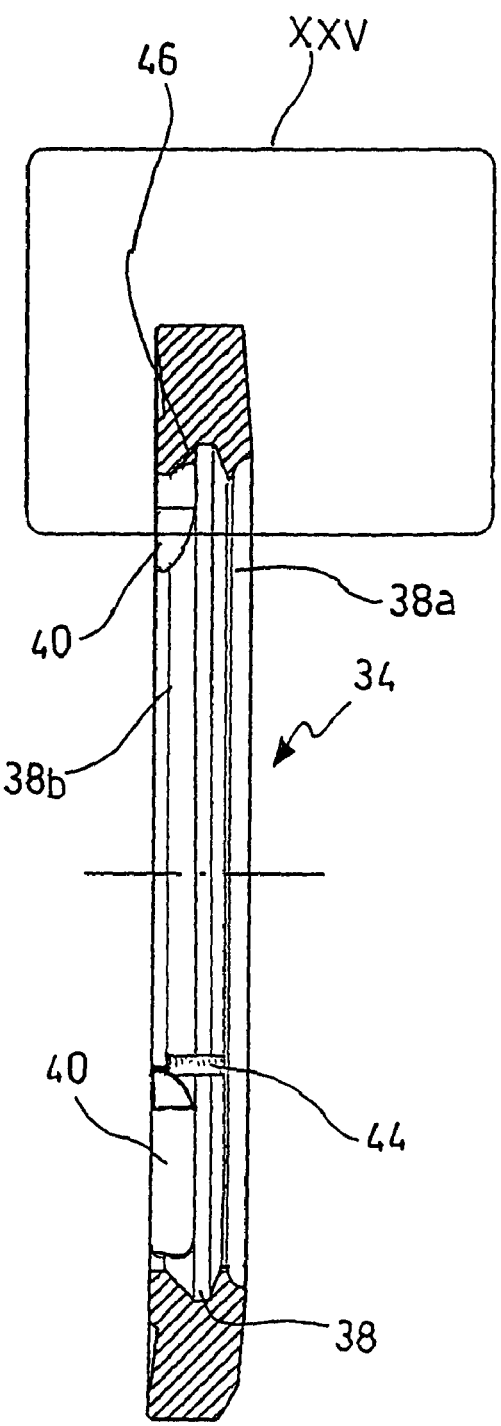
FIG. 24 illustrates a sectional view of the detail from FIG. 21 according to the line XXIV-XXIV from FIG. 21.
Figure 25:
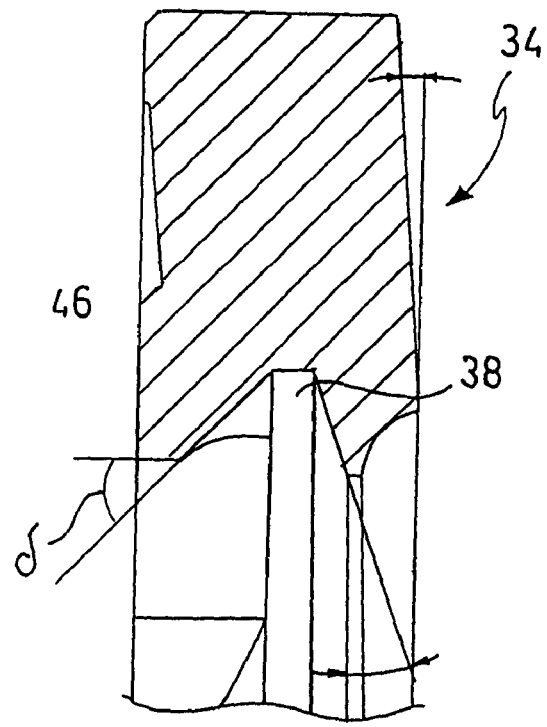
FIG. 25 illustrates a enlarged view of the particular XXV of the detail from FIG. 24.
Figure 26:
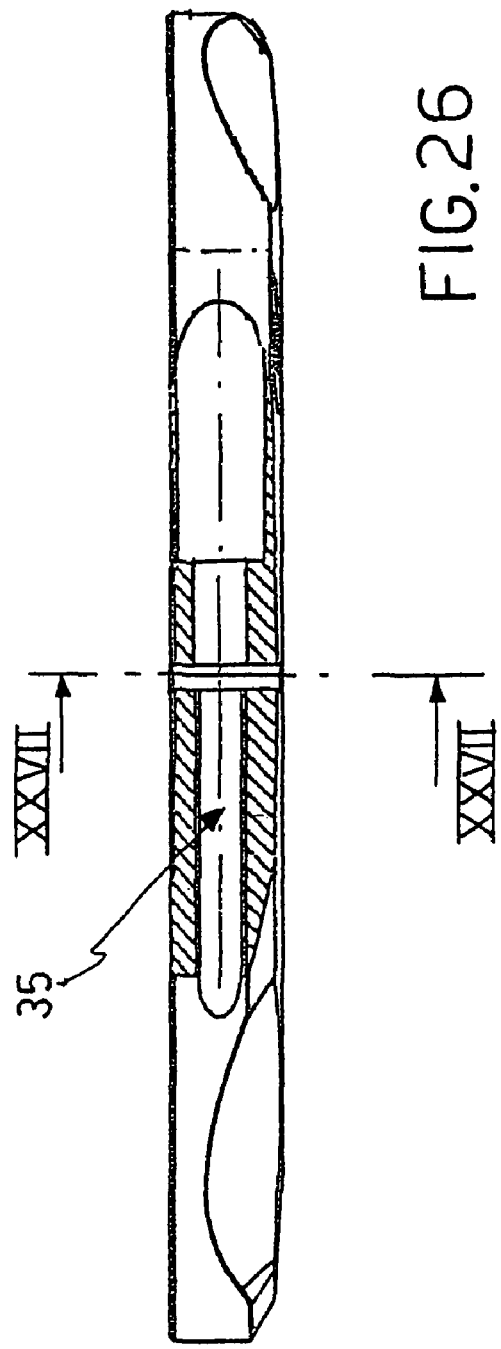
FIG. 26 illustrates a sectional view of the detail from FIG. 21 according to the line XXVI-XXVI from FIG. 14.
Figure 27:
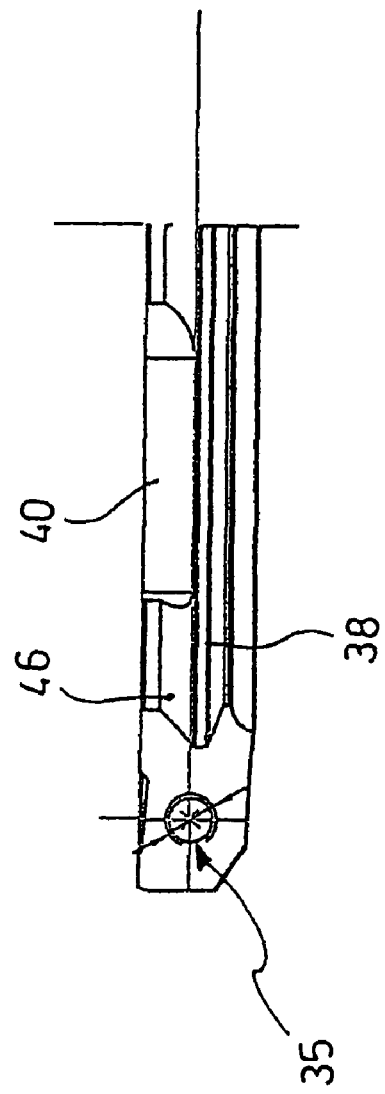
FIG. 27 illustrates a partial and sectional view of the detail from FIG. 21 according to the line from FIG. 26.
Figure 28:
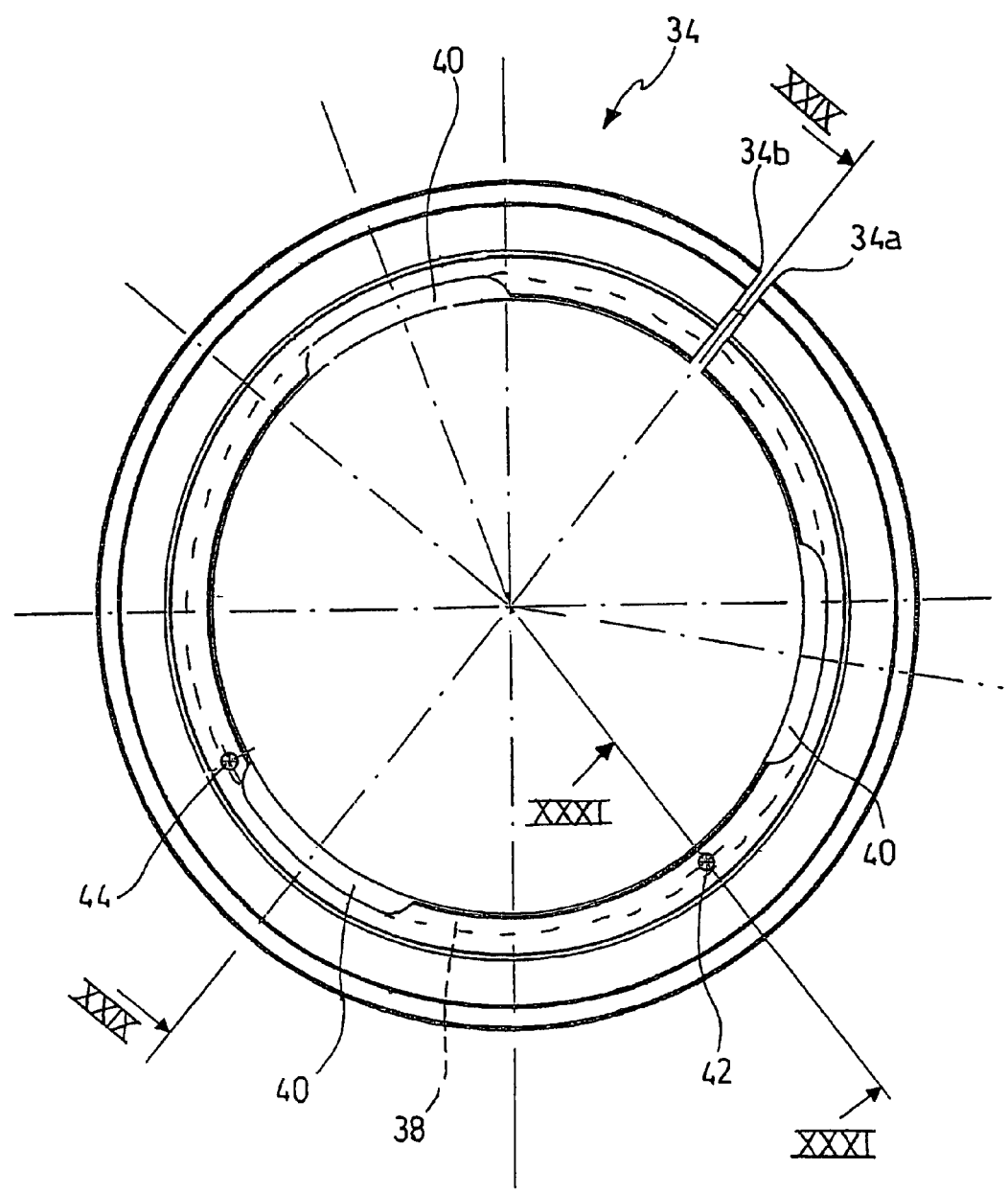
FIG. 28 illustrates the detail from FIG. 21 as seen from behind.
Figure 32:
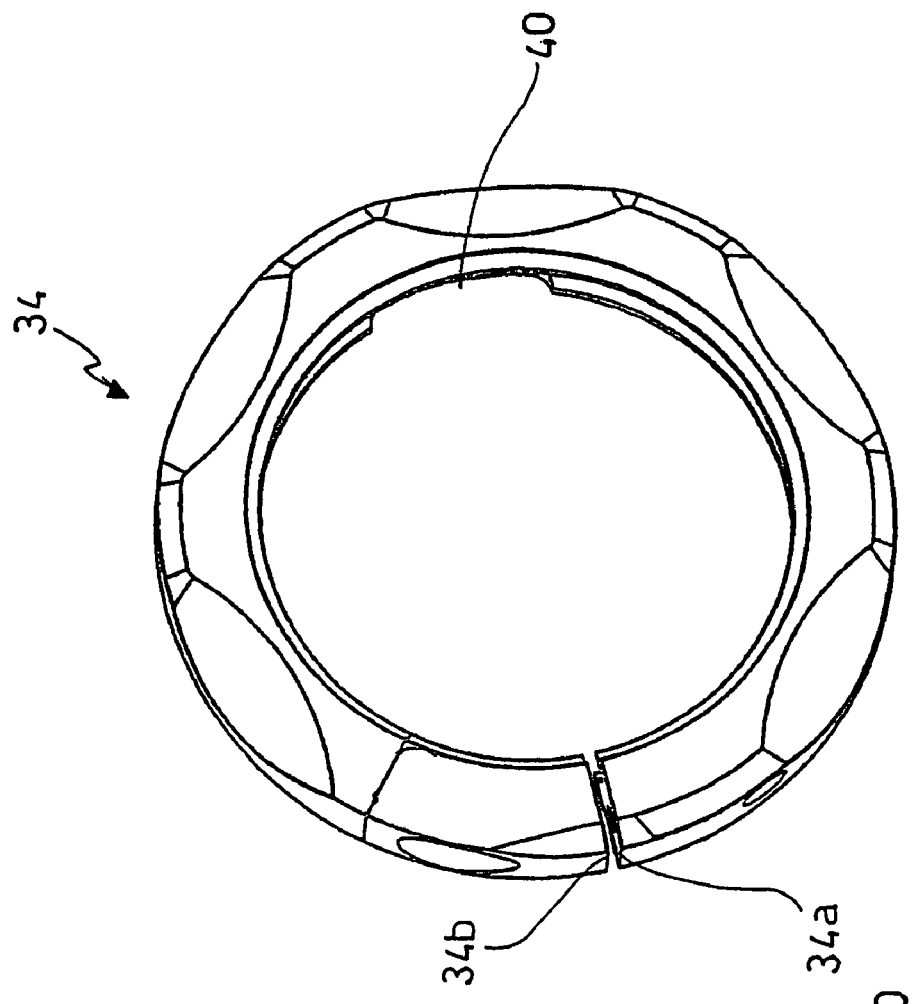
FIGS. 32 and 33 illustrate two perspective views of the detail from FIG. 21 from two different points of view.
Figure 33:
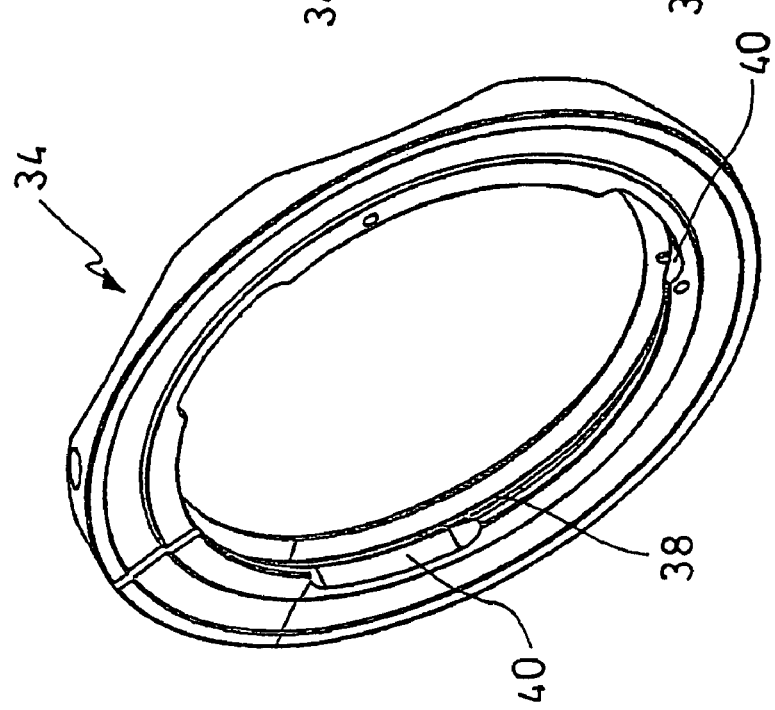

The slope angle of the inclined planes 46, 48 relative to the rotation axis A being designated with δ (considering a radial section of the device such as illustrated in FIG. 10), this angle ranges for example from 10° and 80°, preferably from 30° and 70°, still more preferably is about 45°.

The assembly and disassembly of a coupling device according to the present invention is described below with reference to the example illustrated in the figures.

Figure 3:
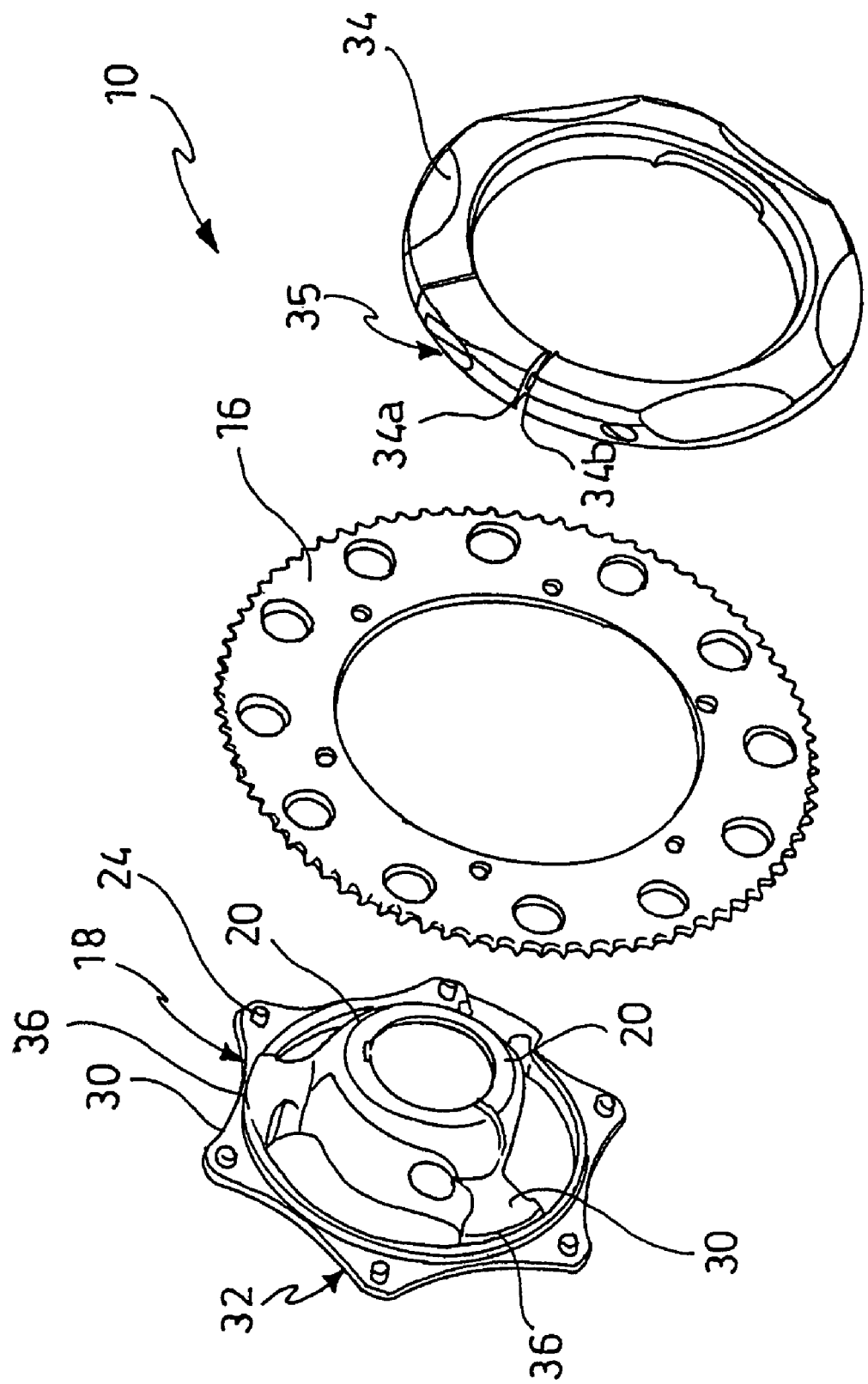
FIG. 3 illustrates a perspective, schematic, cut-away view of the device from FIG. 1.

FIG. 3 is an exploded view of the coupling device in which the support 18 has not yet been splined or coupled to the respective shaft. This step may be provided at any time, either before or after the coupling device has been assembled/disassembled.

Figure 4:
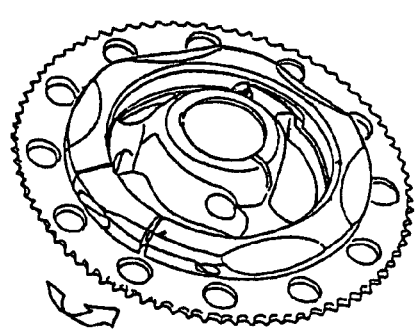
FIG. 4-7 illustrate perspective views of the coupling device according to the present invention corresponding to several steps of the coupling method according to the present invention.

The crown gear 16 is centered on the support 18 for example by coupling the threaded dowels 24 to the respective seats 26 and 28 of the crown gear and support. An example of this first step is illustrated in FIG. 4.

Subsequently, the locking member 34 is axially adjoined to the support 18 and the crown gear 16 such that the teeth 36 of the support 18 are inserted within the passageways 40 of the locking member 34.

Figure 5:
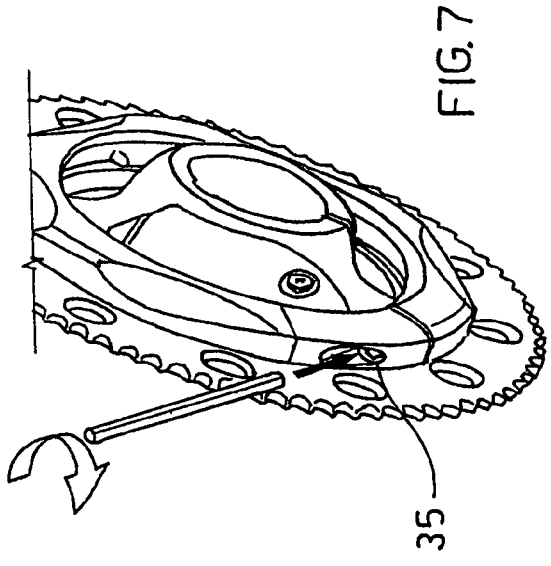
Figure 6:
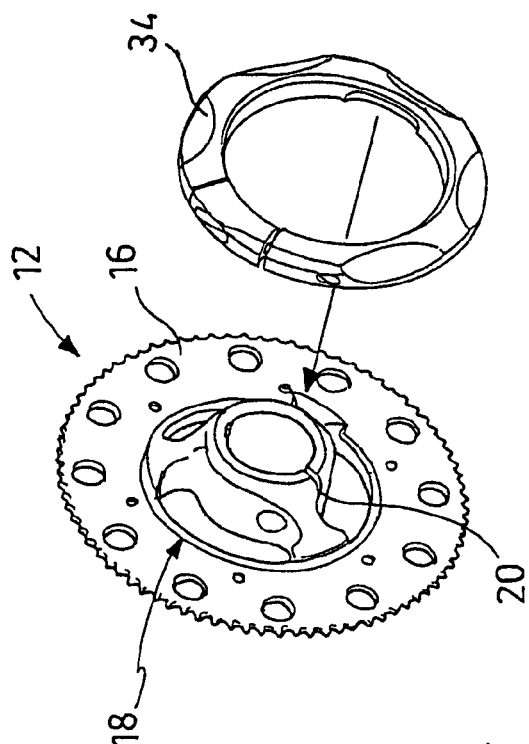

The second end-of-stroke 44 prevents the rotation in a way, for example clockwise as shown in FIG. 5 whereas the locking member 34 can be rotated in the other way, for example counter-clockwise as shown in FIG. 5, until the first end-of-stroke 42 encounters one of the teeth 36. In this position (FIG. 6), the teeth 36 are properly positioned within the groove 38 such as illustrated for example in FIG. 10.

Figure 7:
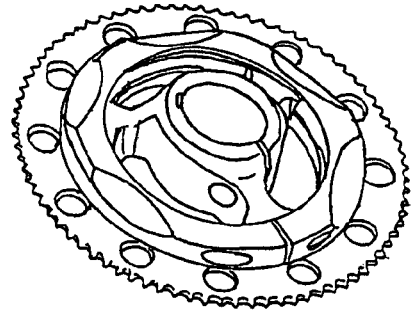
Figure 8:
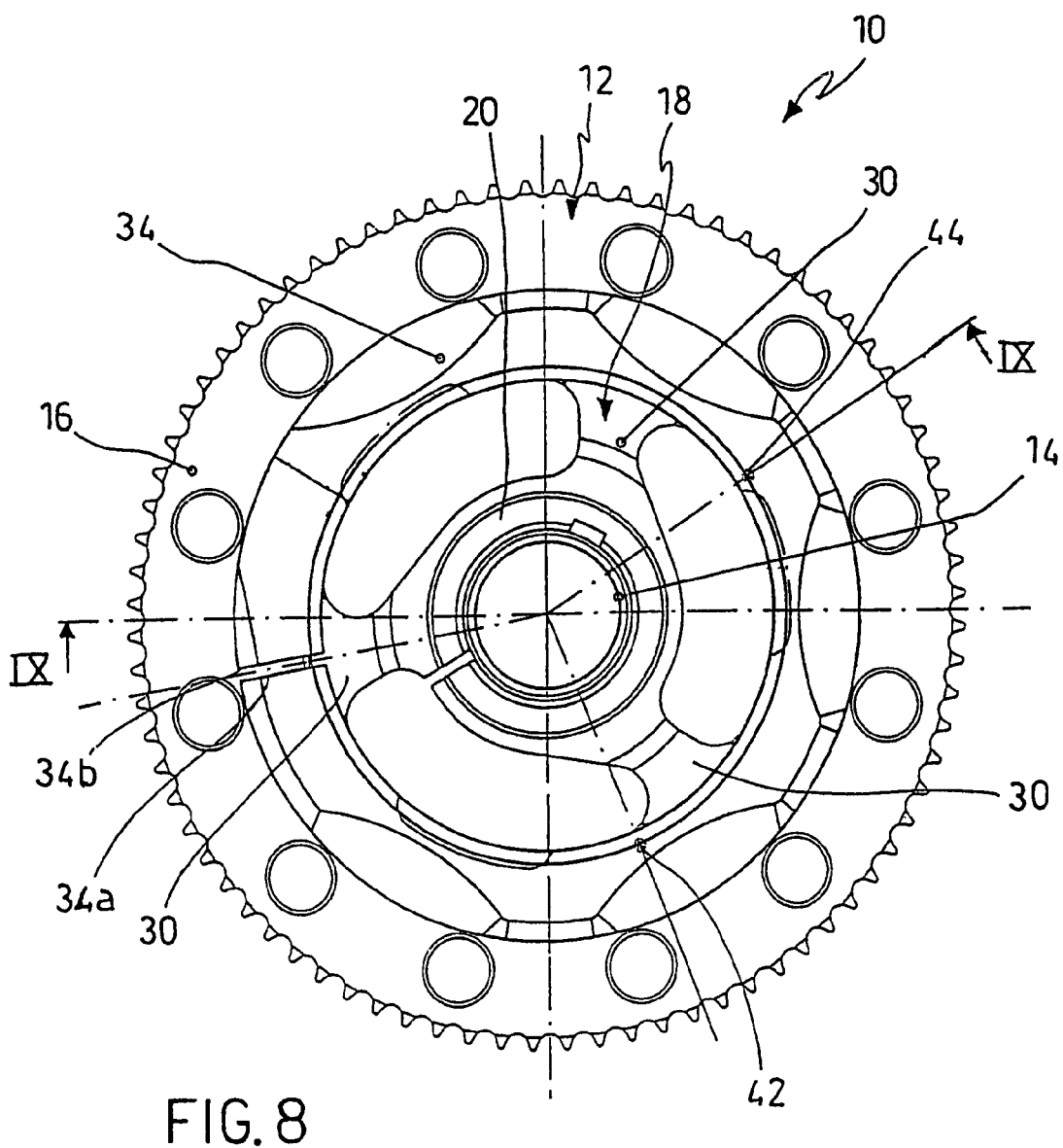
FIG. 8 illustrates a front view of the coupling device from FIG. 1.

The radial or circumferential dimensions of the locking member are then varied, particularly reduced, by rotating the screw 35. More particularly, when the screw 35 is tightened the two free ends 34a and 34b will move towards each other thereby reducing the radial or circumferential dimensions of the locking member 34 (FIG. 7).

Figure 11:
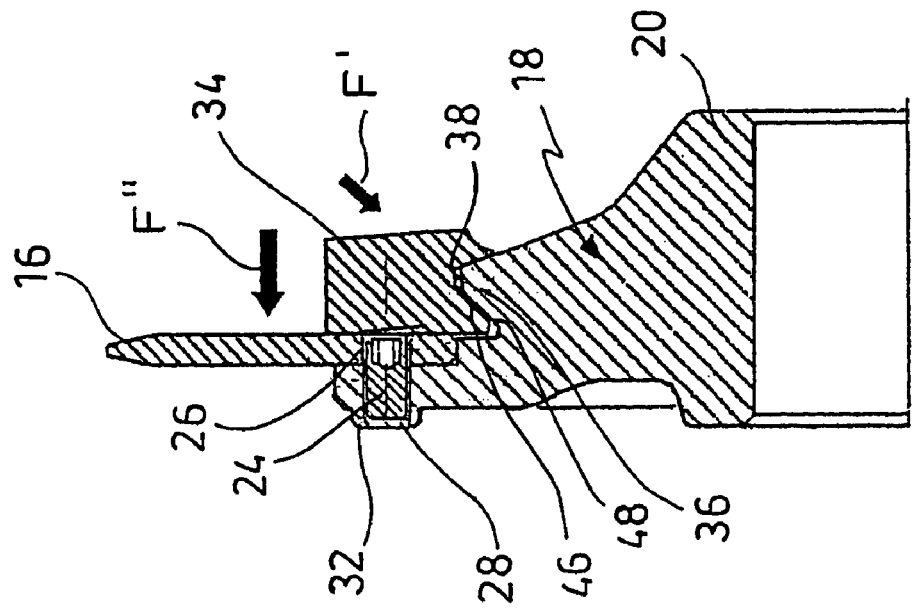
FIGS. 10 and 11 illustrate schematic and sectional views of the coupling device, which correspond to two steps of the coupling method according to the present invention.

The effects of this step are illustrated in greater detail in FIGS. 10 and 11. By moving the free ends 34a and 34b and the locking member 34 towards each other, a reduction is obtained in the radius of the locking member 34 (arrow F) which locks the locking member 34 on support 16. Furthermore, there is generated a sliding of the inclined plane 46 of the locking member 34 on the inclined plane 48 of the support 18 (arrow F') such that the locking member 34 is moved towards the crown gear 16 (arrow F"). To this movement, there corresponds a thrust exerted by the locking member 34 on the crown gear 16 and against the peripheral portion 32 of the support 18, the latter being thereby locked between the support and the locking member.

For a quick disassembly of the coupling device according to the present invention, it is thus sufficient to carry out the above steps in the reverse order. Particularly, the screw 35 is unscrewed within the threaded seats such that the free ends 34a and 34b are move away from the locking member 34. The radial or circumferential dimension of the locking member increases when it is unfastened from the support 18. Furthermore, the inclined plane 46 of the locking member slides on the inclined plane 48 of the support 18 in the direction opposite arrow F'. To this movement the locking member 34 responds by moving away from the crown gear 16. When the radial dimension of the locking member 34 is sufficiently widened to allow the same to rotate relative to the support 18, the locking member 34 is caused to rotate in the opposite direction than previously (and thus in the clockwise direction with reference to FIG. 5) until the second end-of-stroke 44 i.e. until the angular position where the teeth 36 and passageways 40 are aligned, such that the locking member 34 can be moved away in the axial direction from the support 18.

Finally, the crown gear 16 is pulled off the threaded dowels 24 for replacement.

The present invention thus also relates to a method for coupling pulleys or gear wheels or similar units. With reference to the coupling of gear wheels consisting of a support 18 and a crown gear 16 the coupling method according to the present invention comprises the steps of:

centering the crown gear 16 on the support 18;

associating a locking member 34 to the support 18 such that this locking member 34 defines a constraint in the axial direction between the crown gear 16 and the support, fixing the locking member 34 to the support 18 to define an abutment for the crown gear 16 or the operating portion.

Advantageously, the locking member 34 is provided to be locked 34 on the support by means of a shape coupling.

Preferably, the method according to the present invention provides that the shape coupling generates a constraint between the locking member 34 and the support 18 and a pressure by the locking member 34 against the crown gear 16 that is locked between the support 18 and the locking member.

In other words, the coupling method according to the present invention provides that the locking member 34 is tightened on the support 18 by varying, preferably reducing, the radial and circumferential dimensions of the locking member such that interference is created between the locking member and the support. Furthermore, this variation in the dimensions of the locking member 34 is provided such that the locking member 34 is moved towards the crown gear 36 for holding the latter between the support 18 and the locking member.

From what has been stated above, it should be appreciated how the provision of a coupling device and method according to the present invention allows to meet said requirement for quicker and easier replacement of elements such as gear wheels, pulleys and the like for example being part of drive systems.

A further advantage of the coupling device and method according to the invention is the uncommon structural simplicity of the same, which allows the same to be produced at very low cost.

It should be understood that variations and/or additions may be provided to what has been described and illustrated above.

Alternatively to what has been depicted in the annexed figures, the element to be replaced may be a pulley or other similar structures. In this case, the support 18 will be connected to an operating portion of the pulley or particular unit.

Furthermore, this element may be a part of a drive system or other systems.

To the preferred embodiment of the coupling device and method such as described above, those of ordinary skill in the art, aiming at satisfying contingent and particular requirements, will be able to carry out modifications, adaptations and replacements of elements with others functionally equivalent, without however departing from the scope of the following claims.

The invention claimed is:

1. A coupling device comprising:
    a support member comprising an annular body having a middle hub portion with a support face circumferentially surrounding said middle hub portion and at least one spoke radially extending along said support face from said middle hub portion and comprising a locking mechanism disposed on a circumferential edge of said at least one spoke;

a gear wheel comprising a center opening and gear teeth spaced around an outer periphery of said gear wheel;

a locking member having an open ring shape with two free ends and a mechanism to bring said two free ends together in a locked position and comprising a locking structure disposed on an inner annular edge of said locking member;

said support member including a plurality of projections disposed around and axially extending from said support face in a direction parallel to a rotation axis of said gear wheel;

said gear wheel including a plurality of openings disposed around and axially extending through said gear wheel, said gear wheel being mounted on said support face of said support member such that each said at least one spoke longitudinally extends through the center opening in said gear wheel to engage said locking member and each of said plurality of projections is disposed in a respective one of said plurality of openings; and said locking member being disposed around said circumferential edge of each said at least one spoke such that said locking structure of said locking member interlockably engages said locking mechanism of said at least one spoke so that said locking member is attached to said support member with a portion of said gear wheel being clamped between said locking member and said support face of said support member in the locked position.

2. The coupling device as defined in claim 1, wherein said support member includes a plurality of spokes.

3. The coupling device as defined in claim 2, wherein said support member includes three spokes spaced equally around said support member.

4. The coupling device as defined in claim 1, wherein said mechanism to bring said two free ends together includes a threaded member disposed in a threaded opening formed in said two free ends of said locking member.

5. The coupling device as defined in claim 1, wherein said support member includes at least one tooth disposed on a circumferential edge of said at least one spoke and said locking member includes a circumferential groove on an annular edge of said locking member so that when said locking member is connected to said support member, said at least one tooth is disposed in the circumferential groove to form a coupling between said locking member and said support member such that said at least one tooth is received in the circumferential groove and said support member is rotated into a locked position.

6. The coupling device as defined in claim 5, wherein the circumferential groove and the at least one tooth have respective V-shaped, counter-shaped radial sections defining mutually facing, inclined planes.

7. The coupling device as defined in claim 1, wherein said locking member includes at least one tooth disposed on a circumferential edge of said locking member and said support member includes a circumferential groove on an annular edge of said at least one spoke so that when said locking member is connected to said support member, said at least one tooth is disposed in the circumferential groove to form a coupling between said locking member and said support member such that said at least one tooth is received in the circumferential groove and said locking member is rotated into a locked position.

8. The coupling device as defined in claim 7, wherein the circumferential groove and the at least one tooth have respective V-shaped, counter-shaped radial sections defining mutually facing, inclined planes.

9. A coupling device comprising:

a support member comprising an annular body having a middle hub portion with a support face circumferentially surrounding said middle hub portion and at least one spoke radially extending along said support face from said middle hub portion and comprising a locking mechanism disposed on a circumferential edge of said at least one spoke;

a pulley comprising a center opening and gear teeth spaced around an outer periphery of said pulley;

a locking member having an open ring shape with two free ends and a mechanism to bring said two free ends together in a locked position and comprising a locking structure disposed on an inner annular edge of said locking member;

said support member including a plurality of projections disposed around and axially extending from said support face in a direction parallel to a rotation axis of said pulley;

said pulley including a plurality of openings disposed around and axially extending through said pulley, said pulley being mounted on said support face of said support member such that each said at least one spoke longitudinally extends through the center opening in said pulley to engage said locking member and each of said plurality of projections is disposed in a respective one of said plurality of openings; and said locking member being disposed around said circumferential edge of each said at least one spoke such that said locking structure of said locking member interlockably engages said locking mechanism of said at least one spoke so that said locking member is attached to said support member with a portion of said pulley being clamped between said locking member and said support face of said support member in the locked position.

10. The coupling device as defined in claim 9, wherein said support member includes a plurality of spokes.

11. The coupling device as defined in claim 10, wherein said support member includes three spokes spaced equally around said support member.

12. The coupling device as defined in claim 9, wherein said mechanism to bring said two free ends together includes a threaded member disposed in a threaded opening formed in said two free ends of said locking member.

13. The coupling device as defined in claim 9, wherein said support member includes at least one tooth disposed on a circumferential edge of said at least one spoke and said locking member includes a circumferential groove on an annular edge of said locking member so that when said locking member is connected to said support member, said at least one tooth is disposed in the circumferential groove to form a coupling between said locking member and said support member such that said at least one tooth is received in the circumferential groove and said support member is rotated into a locked position.

14. The coupling device as defined in claim 13, wherein the circumferential groove and the at least one tooth have respective V-shaped, counter-shaped radial sections defining mutually facing, inclined planes.

15. The coupling device as defined in claim 9, wherein said locking member includes at least one tooth disposed on a circumferential edge of said locking member and said support member includes a circumferential groove on an annular edge of said at least one spoke so that when said locking member is connected to said support member, said at least one tooth is disposed in the circumferential groove to form a coupling between said locking member and said support member such that said at least one tooth is received in the circumferential groove and said locking member is rotated into a locked position.

16. The coupling device as defined in claim 15, wherein the circumferential groove and the at least one tooth have respective V-shaped, counter-shaped radial sections defining mutually facing, inclined planes.

* * * * *